(12) United States Patent
Nishi et al.

(10) Patent No.: US 9,772,221 B2
(45) Date of Patent: Sep. 26, 2017

(54) MULTIDIRECTIONAL PHOTODETECTOR, A PORTABLE COMMUNICATION TOOL HAVING THEREOF AND A METHOD OF DISPLAYING

(75) Inventors: Kazuo Nishi, Yamanashi (JP); Yu Yamazaki, Kanagawa (JP); Tomoyuki Iwabuchi, Kanagawa (JP); Keisuke Miyagawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1041 days.

(21) Appl. No.: 12/546,725

(22) Filed: Aug. 25, 2009

(65) Prior Publication Data

US 2009/0309859 A1 Dec. 17, 2009

Related U.S. Application Data

(62) Division of application No. 10/807,543, filed on Mar. 24, 2004, now Pat. No. 7,652,658.

(30) Foreign Application Priority Data

Mar. 26, 2003 (JP) .................................. 2003-086247

(51) Int. Cl.
*H01L 27/14* (2006.01)
*G01J 1/02* (2006.01)
(Continued)

(52) U.S. Cl.
CPC ........... *G01J 1/0209* (2013.01); *G01J 1/0233* (2013.01); *G01J 1/0247* (2013.01); *G01J 1/0271* (2013.01);
(Continued)

(58) Field of Classification Search
CPC ....... H01L 2924/00; H01L 2924/00014; H01L 2224/48091; H01L 2224/45144; H01L 2224/48463
(Continued)

(56) References Cited

U.S. PATENT DOCUMENTS 4,598,305 A 7/1986 Chiang
5,406,305 A 4/1995 Shimomura
(Continued)

FOREIGN PATENT DOCUMENTS

DE 101 31 608 A1 1/2003
EP 0 165 764 12/1985
(Continued)

OTHER PUBLICATIONS

Office Action, Korean Application No. 2005-7018032, dated Aug. 30, 2010, 7 pages with English translation.
(Continued)

*Primary Examiner* — Tony Tran
(74) *Attorney, Agent, or Firm* — Fish & Richardson P.C.

(57) ABSTRACT

A photodetector of the invention is characterized by having a plurality of detector elements that are arranged over a light-transparent substrate and are connected in parallel. A foldable portable communication tool having two display portions of the invention is characterized by including one photodetector which includes a plurality of detector elements connected in parallel.

24 Claims, 16 Drawing Sheets

(51) Int. Cl.
  *G01J 1/42* (2006.01)
  *G02F 1/133* (2006.01)
  *G02F 1/1333* (2006.01)
  *H04M 1/02* (2006.01)

(52) U.S. Cl.
  CPC ........... *G01J 1/4204* (2013.01); *G01J 1/4228* (2013.01); *G02F 1/13318* (2013.01); *G02F 2001/133342* (2013.01); *G09G 2360/04* (2013.01); *H04M 1/0214* (2013.01); *H04M 1/0245* (2013.01); *H04M 2250/12* (2013.01)

(58) Field of Classification Search
  USPC ........................................................ 257/431
  See application file for complete search history.

(56) References Cited

U.S. PATENT DOCUMENTS

| | | | |
|---|---|---|---|
| 5,625,198 | A | 4/1997 | Chigira |
| 5,703,436 | A * | 12/1997 | Forrest et al. ................. 313/506 |
| 5,952,992 | A | 9/1999 | Helms |
| 6,167,110 | A | 12/2000 | Possin et al. |
| 6,269,256 | B1 | 7/2001 | Nakamura |
| 6,300,612 | B1 | 10/2001 | Yu |
| 6,351,369 | B1 * | 2/2002 | Kuroda et al. ............. 361/306.3 |
| 6,352,777 | B1 | 3/2002 | Bulovic et al. |
| 6,392,617 | B1 | 5/2002 | Gleason |
| 6,424,326 | B2 | 7/2002 | Yamazaki |
| 6,504,143 | B2 | 1/2003 | Koops |
| 6,828,546 | B2 | 12/2004 | Reime |
| 6,839,101 | B2 | 1/2005 | Shima |
| 7,151,217 | B2 * | 12/2006 | Forrest et al. ................. 136/263 |
| 7,323,759 | B2 | 1/2008 | Knipp et al. |
| 7,345,696 | B2 | 3/2008 | Nakae et al. |
| 2002/0003201 | A1 | 1/2002 | Yu |
| 2002/0027229 | A1 | 3/2002 | Yamazaki |
| 2002/0037754 | A1 | 3/2002 | Hama |
| 2002/0044208 | A1 | 4/2002 | Yamazaki |
| 2002/0071059 | A1 | 6/2002 | Furuya |
| 2004/0056180 | A1 | 3/2004 | Yu |
| 2004/0061126 | A1 | 4/2004 | Imai |
| 2004/0166829 | A1 | 8/2004 | Nakae |
| 2004/0174527 | A1 | 9/2004 | Knipp et al. |

FOREIGN PATENT DOCUMENTS

| | | |
|---|---|---|
| EP | 1 071 313 | 1/2001 |
| EP | 1 195 971 | 4/2002 |
| EP | 1 385 318 A1 | 1/2004 |
| JP | 61-007663 | 1/1986 |
| JP | 61-075568 A | 4/1986 |
| JP | 03-048250 A | 5/1991 |
| JP | 05-129646 A | 5/1993 |
| JP | 06-090015 A | 3/1994 |
| JP | 07-074691 | 3/1995 |
| JP | 2000-156522 A | 6/2000 |
| JP | 2000-311790 | 11/2000 |
| JP | 2002-502120 A | 1/2002 |
| JP | 2002-057776 | 2/2002 |
| JP | 2002-101160 | 4/2002 |
| JP | 2002-111864 | 4/2002 |
| JP | 2002-305565 A | 10/2002 |
| JP | 2002-320012 | 10/2002 |
| JP | 2003-018267 | 1/2003 |
| JP | 2003-032357 | 1/2003 |
| JP | 2003-125060 | 4/2003 |
| JP | 3408154 | 5/2003 |
| JP | 2003-167550 A | 6/2003 |
| JP | 2003-258975 | 9/2003 |
| JP | 2004-096576 | 3/2004 |
| JP | 2004-140472 | 5/2004 |
| JP | 2004-172603 A | 6/2004 |
| KR | 0130498 | 10/1998 |
| WO | 99/39372 A2 | 8/1999 |

OTHER PUBLICATIONS

Chinese Office Action for Application No. 200480008133.8, dated Apr. 4, 2008 with English translation.

Documents distributed in the "13th Flat Panel Display Manufacturing Technology Expo & Conference" by ELDis Group (5 pages), Jul. 2, 2003.

Exhibition of Active Matrix Type Organic EL Display at "13th Flat Panel Display Manufacturing Technology Expo & Conference" by ELDis Group (in Japanese with full translation); Jul. 2, 2003.

International Search Report (Application No. PCT/JP2004/003544), Aug. 24, 2004, 5 pages.

"Mass Production of Organic EL Devices"; *Shimotsuke Newspaper* (in Japanese with full translation); Jul. 3, 2003.

"Two-way display developed"; *The Japan Times*; (1 page); Jul. 3, 2003.

Written Opinion (Application No. PCT/JP2004/003544) with partial translation, Aug. 24, 2004, 7 pages.

European Search Report (European Patent Application No. 04721304.6) dated Oct. 24, 2012, 6 pages.

\* cited by examiner in the open state in the closed state

MULTIDIRECTIONAL PHOTODETECTOR, A PORTABLE COMMUNICATION TOOL HAVING THEREOF AND A METHOD OF DISPLAYING

CROSS-REFERENCE TO RELATED APPLICATIONS

This application is a divisional of U.S. application Ser. No. 10/807,543, filed Mar. 24, 2004, now allowed, which claims the benefit of a foreign priority application filed in Japan as Serial No. 2003-086247 on Mar. 26, 2003, both of which are incorporated by reference.

SPECIFICATION

Technical Field

This invention relates to a photodetector and, particularly, to a photodetector for detecting light from a multiplicity of directions. The invention further relates to a portable communication tool and, particularly, to a foldable portable communication tool and to a method of displaying.

Background Art

Portable communication tools include a portable telephone, a PDA, a foldable electronic notebook, a mobile computer, etc., which require a variety of functions such as transmission and reception of a mail, voice recognition, loading an image by using a miniature camera and the like. Accompanying the diversifying functions, an increasing amount of information is displayed, and it has been urged to improve a level of visibility and quality of image. In recent years, a portable telephone which is a representative example of the portable communication tools having a display of a size in excess of two inches and a resolution that meets QVGA (Quarter VGA) has been came in the market.

The display of the portable telephone is used in various environments such as outdoors, indoors, etc. The visibility of the display varies depending upon the ambient brightness (i.e., the intensity of illumination on the side of the display portion: note that, the intensity of illumination is a flux of light received by a unit area of a surface irradiated with light: here, the display portion is illuminated by the ambient light, and the intensity of illumination on the side of the display portion stands for the ambient brightness). For example, under the sunlight or under the illumination, the displayed information can be perceived despite the brilliance of the display is low due to the ambient brightness. In a dark place, the displayed content can be less perceived when the display is too bright compared to the surrounding, and the display can be easily perceived when the brilliance of the display is slightly lowered. While, in a gloomy place in between, it is desired that the brilliance of the display is high for perceiving the displayed contents on display.

Since the visibility of the display differs depending upon the ambient brightness, there has been proposed a method of improving the visibility of the display by providing a sensor for detecting the ambient brightness (intensity of illumination on the side of the display portion) and by varying the brilliance of the display depending upon the ambient brightness.

When an EL (Electro Luminescence) display device is used for a display, a voltage and a current are fed to the EL elements depending upon the brilliance to effect the gradation display. However, the EL element is deteriorated due to an aging factor, and the degree of deterioration differs depending upon three primary colors of RGB. To obtain a multi-color display on the EL display device, therefore, the brilliance of three primary colors of RGB must be adjusted to control white balance. In this case, there has been proposed a method of expressing an image with a correct gradation of a desired color by bringing the brilliance of other colors into agreement with a color that has been deteriorated, i.e., a color having a low brilliance.

Similarly, when a liquid crystal display device is used for a display, the brightness of display differs depending upon the brilliance of back light. Therefore, there has been proposed a method of producing a display with a predetermined brightness at all times by adjusting the brilliance of the display depending on the deterioration of back light due to aging.

As compared to a portable telephone which cannot be folded, the foldable portable telephone has many advantages, i.e., (1) small in size and is portable, (2) the display portion is provided in a first housing, and the operation portion is provided in a second housing enabling the display portion to possess a large display area and to display an increased amount of information at one time, and (3) induces less erroneous operation during the standby.

In the conventional foldable portable telephone, information is displayed on a display being triggered by the reception of electromagnetic waves, depression of operation buttons or opening/closure of the housing (patent document 1).

(Patent document 1) JP-A-2002-101160 (page 6, FIGS. 2 and 7)

DISCLOSURE OF THE INVENTION

Problems that the Invention is to Solve

The power consumption by the portable telephone is increasing accompanying the diversifying functions and an increase in the quality of image of the display. If depletion of the cell is early, there is an affair that a desired function cannot be used when required. Therefore, it is a problem to lower the power consumption.

Further, to simply make sure the time and the history of reception while no call has been received, the key of the portable telephone must be depressed. In the foldable portable telephone, in particular, the operation buttons on the side surface must be depressed or the housings must be opened and closed. These operations are cumbersome. In a dark place, in particular, it is difficult to look for the operation buttons or a portion for opening and closing the housings and there is an affair of requiring a certain period of time before perceiving the display portion.

To lower the power consumption and to heighten the operationality, there may be provided a sensor for detecting the ambient brightness and a brilliance sensor for the display as described above. As for a thing having a plurality of display portions such as the foldable portable telephone, however, the number of sensor parts increases, making it difficult to realize the product in a small size and driving up the cost of production.

Therefore, the present invention provides a photodetector which is capable of detecting light from a multiplicity of directions with one part. The present invention further provides a foldable information communication tool which is small in size having many functions, consuming a low electric power, which can be produced at low cost, and which requires a simple operation for perceiving the display, and a method of displaying information thereof.

Means for Solving the Problems

The photodetector of this invention is characterized by having a plurality of detector elements over a light-transparent substrate and the detector elements being connected in parallel. In addition, A foldable portable communication tool having two display portions of the invention is characterized by having a photodetector that includes a plurality of detector elements which are connected in parallel.

The plurality of detector elements are typically those for detecting the intensity of illumination on the side of a first display portion in a state where the foldable portable communication tool remains opened, are those for detecting the intensity of illumination on the side of a second display portion in a state where the foldable portable communication tool remains closed, and are those for detecting the brilliance of the first display portion. The plurality of detector elements produce a current depending upon a change in the intensity of illumination or in the brilliance. By the current value, the photodetector detects the intensity of illumination and the brilliance. By the current value, further, the brilliance of the first display portion or of the second display portion is adjusted, and the display portion of the foldable portable communication tool produces a display.

The detector element for detecting the intensity of illumination on the side of the first display portion in a state where the foldable portable communication tool remains opened may be the same as the detector element that detects the brilliance of the first display portion.

Here, the first display portion is a display portion that faces the operation portion such as operation buttons when the portable telephone is folded, and the second display portion is a display portion that exists on the outer side of the foldable portable communication tool when the foldable portable communication tool is folded.

The photodetector, portable communication tool and method of displaying of the invention based on the above gist of the invention can encompass the constitutions described below.

The photodetector of the invention includes a plurality of detector elements arranged over the light-transparent substrate and connected in parallel, and is capable of detecting light from a multiplicity of directions.

In the photodetector of the invention, the plurality of detector elements include a first detector element and a second detector element, the first detector element being formed by a first electrode, a first semiconductor film and a second electrode, and the second detector element being formed by the first electrode, a second semiconductor film and a third electrode. Here, the first electrode and the third electrode are formed by using a conductive film having light-transparent property, and a second conductive film is formed by using a metal film.

In the photodetector of the invention, further, the plurality of detector elements include a first detector element, a second detector element and a third detector element, the first detector element being formed by a first electrode, a first semiconductor film and a second electrode, the second detector element being formed by the first electrode, a second semiconductor film and a third electrode, and the third detector element being formed by the first electrode, the first semiconductor film and a fourth electrode. Here, the first electrode and the third electrode are formed by using a conductive film having light-transparent property, and the second electrode and the fourth electrode are formed by using a metal film.

The conductive film having light-transparent property is formed by using an indium oxide-tin oxide alloy, an indium oxide-zinc oxide alloy, or zinc oxide. Further, the metal film includes an element of gold, copper, nickel, platinum or silver.

The first semiconductor film, second semiconductor film and third semiconductor film are formed by using an amorphous silicon film, a silicon film having PIN junction, or a fine crystalline silicon film.

In addition, the portable information tool of the invention includes a first housing and a second housing coupled together through a hinge portion so as to can be opened and closed, the first housing having a first display portion and a second display portion being provided on different surfaces, and the second housing being provided with an operation portion and is foldable in a manner that the first display portion and the operation portion face each other and, further, and has a photodetector including a plurality of detector elements connected in parallel.

In another portable information tool of the invention, the photodetector including a plurality of detector elements is provided in the first housing, and when the plurality of detector elements include a first detector element and a second detector element, the first detector element detects the intensity of illumination on the side of the first display portion when the first housing and the second housing are opened, and the second detector element detects the intensity of illumination on the side of the second display portion.

In another portable information tool of the invention, the photodetector including a plurality of detector elements is provided in the second housing, and when the plurality of detector elements include a first detector element and a second detector element, the first detector element detects the intensity of illumination on the side of the first display portion in a state where the first housing and the second housing are opened, detects the brilliance of the first display portion in a state where the first housing and the second housing are folded, and the second detector element detects the intensity of illumination on the side of the second display portion. Here, the photodetector may be provided on inside of the operation buttons having light-transparent property of the operation portion.

In another portable information tool of the invention, the photodetector including a plurality of detector elements is provided in the first housing, and when the plurality of detector elements include a first detector element, a second detector element and a third detector element, the first detector element detects the intensity of illumination on the side of the first display portion when the first housing and the second housing are opened, the second detector element detects the intensity of illumination on the side of the second display portion, and the third detector element detects the brilliance of the first display portion.

Further, the portable information tool of the invention includes a first housing and a second housing coupled together so as to can be opened and closed through a hinge portion, wherein a first display portion and a second display portion are provided in different surfaces of the first housing, the operation portion is provided in the second housing, the first display portion and the operation portion being foldable so as to be faced to each other, and the portable information tool further comprising first means for detecting the intensity of illumination on the side of the first display portion in a state where the first housing and the second housing are opened, second means for display by controlling the brilliance of the first display portion depending upon the result detected by the first means, third means for detecting the intensity of illumination on the side of the second display portion in a state where the first housing and the second housing are folded, and fourth means for display by adjusting the brilliance of the second display portion depending upon the result detected by the third means.

The portable information tool further comprises fifth means for causing the first display portion to assume a display state and to detect the brilliance thereof in a state where the first housing and the second housing are folded, and sixth means for display by controlling the brilliance of the first display portion depending upon the result detected by the fifth means and upon the result detected by the first means.

The first display portion and the second display portion are formed by using a liquid crystal display device or an EL display device. The EL display device may be the one capable of emitting light from both surfaces.

According to a method of displaying of the portable information tool of the invention, when the photodetector includes a first detector element and a second detector element, the first detector element detects the intensity of illumination on the side of the first display portion to obtain a first result of detection in a state where the first housing and the second housing are opened, and information is displayed by controlling the brilliance of the first display portion by the first result of detection, and in a state where the first housing and the second housing are folded, the intensity of illumination on the side of the second display portion is detected by the second detector element to obtain a second result of detection, and information is displayed by adjusting the brilliance of the second display portion depending upon the second result of detection.

Further, in a state where the first housing and the second housing are folded, the first display portion is rendered to display information, the brilliance thereof is detected by the first detector element to obtain a third result of detection, and the brilliance of the first display portion may be controlled to display information depending upon the third result of detection and the first result of detection.

According to a method of displaying of the portable information tool of the invention, further, when the photodetector includes a first detector element, a second detector element and a third detector element, the third detector element detects the brilliance of the first display portion to obtain a first result of detection in a state where the first housing and the second housing are folded, the first detector element detects the intensity of illumination on the side of the first display portion to obtain a second result of detection in a state where the first housing and the second housing are opened, information is displayed by controlling the brilliance of the first display portion depending upon the first result of detection and the second result of detection, and in a state where the first housing and the second housing are folded, the second detector element detects the intensity of illumination on the side of the second display portion to obtain a third result of detection, and information is displayed by adjusting the brilliance of the second display portion depending upon the third result of detection.

Effect of the Invention

A photodetector capable of detecting light in a multiplicity of directions is fabricated by connecting a plurality of detector elements in parallel over a substrate having light-transparent property.

A miniature and foldable communication tool that consumes a small amount of electric power is fabricated by providing a foldable communication tool with the photodetector having a plurality of detector elements connected in parallel.

The second display portion can produce a display depending upon a change in the ambient brightness without requiring cumbersome operation of the operation portion, and the time and with or without the reception can be confirmed by the second display portion without through complex and cumbersome steps.

The first display portion and the second display portion can control the brilliance by the ambient brightness to suppress the power consumption for displaying the display portions and to improve visibility.

Further, the third detector element detects the brilliance of the first display portion, and the brilliance of the first display portion can be controlled based on the result of detection to obtain a display maintaining highly visibility irrespective of the degree of the deterioration of the display portions.

BEST MODE FOR CARRYING OUT THE INVENTION

Embodiment modes of the invention will be described below with reference to the drawings. However, the invention can be carried out in a variety of different modes and it is easily understood by those skilled in the art that the modes and the details of the invention can be changed in various ways without departing from the gist and scope of the invention. Therefore, the invention should not be interpreted being limited to only the contents of the embodiment modes disclosed herein.

The following embodiment modes deal with a portable telephone as a representative example of the foldable portable communication tools. Not being limited thereto only, however, the invention can be also applied to the foldable electronic notebook, foldable mobile computer and the like in place of the portable telephone.

Embodiment Mode 1

Figures 5A, 5B:
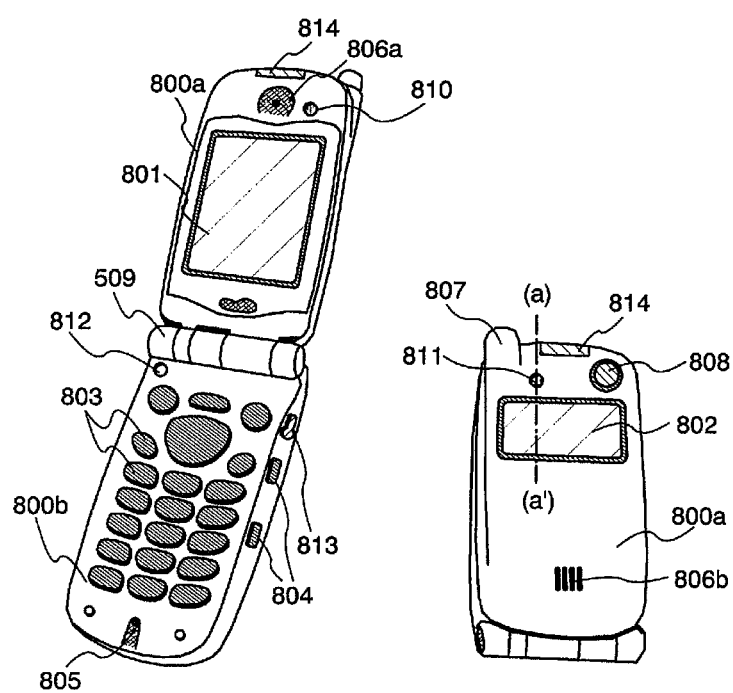
FIGS. 5(A) and 5(B) are views illustrating the embodiment mode 1 of the invention.

FIG. 5 is a schematic view of a portable telephone according to the invention, FIG. 5(A) is a perspective view in a state where the housings are opened and FIG. 5(B) is a perspective view in a state where the housings are closed, i.e., a perspective view as viewed from the side of a first housing 800a provided with a second display portion 802.

The portable telephone has two housings 800a and 800b which are connected together via a hinge 509, and which can be opened and closed with the hinge 509 as a center.

The first housing 800a is provided with a first display portion 801, a second display portion 802, speakers 806a and 806b, an antenna 807, a camera lens 808, a first daylight hole 810, a second daylight hole 811, a lamp 814 and the like.

The second housing 800b includes operation buttons 803, operation buttons 804 provided on the side surface of the portable telephone, a microphone 805, an open/closure detector switch 812, a headphone terminal cover 813 and the like.

The first display portion 801 is constituted by an EL (Electro Luminescence) display device which is a color or monochromatic liquid crystal display device or a light-emitting display device, and displays detailed data such as character data related to the reception of electromagnetic waves (typically, reception of electromagnetic waves or a mail), character data and image data obtained by receiving electromagnetic waves (typically, content of the received mail, content of WEB received), time, image data shot by using a camera incorporated therein, as well as data (typically, names, telephone numbers, addresses, etc.) stored in a storage medium. When the housings of the portable telephone are closed, i.e., are folded so that the first display portion 801 and the operation buttons 803 are opposed to each other, the first display portion does not display image and is turned OFF.

The second display portion 802 is constituted by an EL (Electro Luminescence) display device which is a color or monochromatic liquid crystal display device or a light-emitting display device, and displays simple data such as character data related to the reception of electromagnetic waves, time and data stored in the storage medium. When the housings of the portable telephone are opened, the second display portion does not display image and is turned OFF.

The operation buttons 803 include an numeric keypad, a power source key, a connection key, a mail key, a WEB key, a selection key, etc. The numeric keypad is bearing numerals and characters, and are used for inputting the data. The power source key is for turning the power source of the portable telephone ON and OFF, and for selecting the end of talk being received. The connection key is for connecting the electromagnetic waves being received or for transmitting the electromagnetic waves. The mail key and the WEB key are for receiving or transmitting their respective data. The selection key is for selecting the data stored in the storage medium and for selecting the function. The operation buttons 804 provided on the side surface of the portable telephone are the selection keys for turning the second display portion 802 on, for connecting the electromagnetic waves being received, and for recording voice while the foldable portable telephone is in the closed state.

The microphone 805 has a function for transmitting the voice of talk.

The speakers 806a and 806b have a function for emitting a sound such as the sound of reception, voice of a speech partner who is talking, alarm, music sound and the like. The speaker 806a is chiefly for emitting the voice of the speech partner who is talking, and the speaker 806b is chiefly for emitting the sound of reception, alarm, music sound, etc.

The antenna 807 is for transmitting or receiving the electromagnetic waves necessary for the communication.

The camera lens 808 is for shooting a subject by a digital still camera incorporated in the portable telephone.

The first daylight hole 810 is for introducing the ambient light onto the detector element that measures the intensity of illumination on the side of the first display portion 801, and is covered with a covering member (not shown) so that moisture, dust and the like will not enter into the portable telephone.

The second daylight hole 811 is for introducing the ambient light onto the detector element that measures the intensity of illumination on the side of the second display portion 802, and is covered with a covering member (not shown) like the first daylight hole.

The open/closure detector switch 812 is for mechanically detecting whether the housings of the foldable portable telephone are in the open state or in the closed state. Though the embodiment mode has employed the one that mechanically detects, it is also allowable, not being limited thereto only, to employ an angle sensor for detecting the angle between the first housing 800a and the second housing 800b or a photodetector for detecting the intensity of illumination of the first housing 800a or the second housing 800b.

The headphone terminal cover 813 is for protecting the connection terminal port of the headphone.

The lamp 814 flashes during the reception of electromagnetic waves and turns on during the electric charging, to let the user know the situations in which it is placed. A light-emitting diode (LED) is chiefly used.

Figure 3:
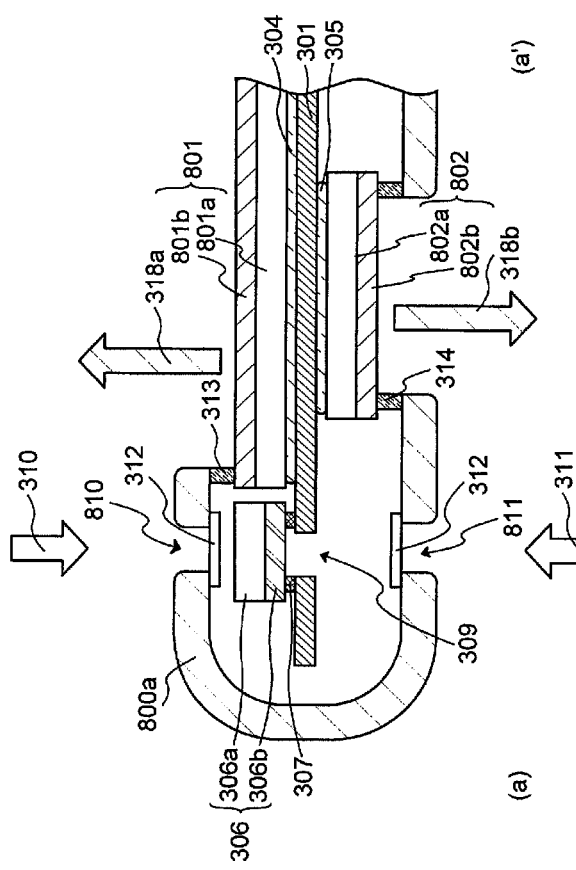
FIG. 3 is a view illustrating the embodiment mode 1 of the invention.

Next, FIG. 3 is a sectional view along (a)-(a') of FIG. 5(B). The same portions as those of FIG. 5 are denoted by the same reference numerals but are not described in detail.

The first display portion 801 and the second display portion 802 are secured to a wiring board 301 by using adhesives 304 and 305. The first display portion 801 is formed by a substrate 801a and a light-emitting region 801b provided thereon. Similarly, the second display portion 802 is formed by a substrate 802a and a light-emitting region 802b provided thereon. A first light 318a is emitted from the first display portion 801, and a second light 318b is emitted from the second display portion 802. The second display portion 802 is provided on the opposite side of the first display portion 801 via the wiring board 301.

A photodetector 306 is mounted on the wiring board 301 by using a conductive member 307 such as gold, silver or solder. The photodetector 306 is formed by a substrate 306a and a light-receiving region 306b provided thereon. The photodetector 306 is provided among the first daylight hole 810, second daylight hole 811 and a through hole 309 formed in the wiring board 301. Upon receiving a light 310 on the side of the first display portion 801 through the first daylight hole 810, part of the light-receiving region 306b of the photodetector 306 measures the intensity of illumination on the side of the first display portion 801. Further, upon receiving a light 311 through the second daylight hole 811 and the through hole 309, part of the light-receiving region 306b of the photodetector 306 measures the intensity of illumination of the second display portion 802 or of the periphery thereof. The photodetctor is provided in the peripheries of the display portions. Namely, the intensity of illumination is nearly the same between the display portions and the periphery thereof where the photodetector is provided. Therefore, the photodetector 306 is capable of detecting the intensity of illumination on the sides of the respective display portions.

The first daylight hole 810 and the second daylight hole 811 are provided with light-transparent cover members 312 so that water and dust will not infiltrate into the first housing 800a.

Further, the gaps among the displays of the display portions and the housing are sealed with sealing members 313 and 314 so that water and dust will not infiltrate into the housing through the gaps.

Figure 1:
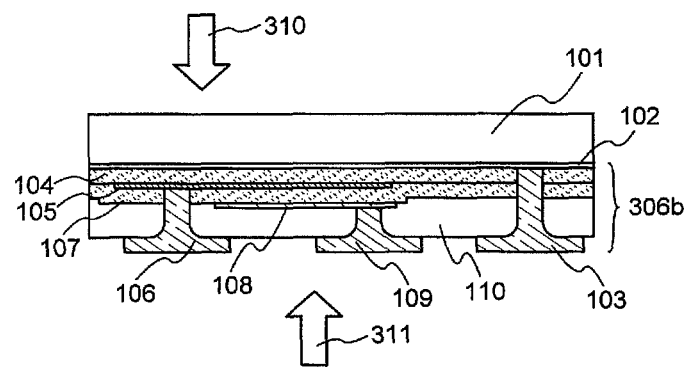
FIG. 1 is a view illustrating an embodiment mode 1 of the invention.

The photodetector according to the invention will be described with reference to FIG. 1. FIG. 1 is a view illustrating the photodetector 306 of FIG. 3 on an enlarged scale. It comprises a substrate 101 (corresponds to 306a in FIG. 3) having light-transparent property and a first transparent electrode 102 made of a conductive film having light-transparent property, such as ITO (indium oxide/tin oxide alloy), indium oxide/zinc oxide alloy ($In_2O_3$—ZnO) or zinc oxide (ZnO).

The first detector element (509a in FIG. 7) is constituted by a first transparent electrode (polarity: plus) 102, a wiring 103 connected to the first transparent electrode 102, a first semiconductor film 104, a metal electrode (polarity: minus) 105, and a wiring 106 connected to the metal electrode 105. On the other hand, the second detector element (509b in FIG. 7) is constituted by a first transparent electrode (polarity: plus) 102, a wiring 103 connected to the first transparent electrode 102, a second semiconductor film 107, a second transparent electrode (polarity: minus) 108, and a wiring 109 connected to the second transparent electrode 108. The wirings 103, 106 and 109 connected to the electrodes of the first detector element and the second detector element are insulated by an organic resin 110 having light-transparent property. The light-receiving region 306b of FIG. 3 is formed by the first detector element and the second detector element.

The substrate 101 having light-transparent property may be a glass substrate or a plastic substrate. The plastic substrate may be the one of PET (polyethylene terephthalate), PEN (polyethylene naphthalate), PES (polyether sulfide), polypropylene, polypropylene sulfide, polycarbonate, polyetherimide, polyphenylene sulfide, polyphenylene oxide, polysulfone or polyphthalamide.

The first semiconductor film 104 and the second semiconductor film 107 are formed by using an amorphous silicon film, a silicon film having a PIN junction or a fine crystalline silicon film. The silicon film having a PIN junction is constituted by a p-type semiconductor layer, an n-type silicon layer, and an i-type (intrinsic) silicon layer sandwiched between the p-type silicon layer and the n-type silicon layer.

The metal electrode 105 is made of a conductive film containing an element such as gold, copper, nickel, platinum, silver or the like.

The first transparent electrode 102 is common to the first detector element and to the second detector element.

The first detector element detects the brightness (intensity of illumination) of the light 310 irradiated the first display portion. The second detector element detects the brightness (intensity of illumination) of the light 311 irradiated the second display portion. In the detector elements, the metal electrode 105 has a function for shutting off the light.

Therefore, light (intensity of illumination) irradiated one display portion only is detected.

Constitution of the portable telephone of the embodiment mode will be described by using a block diagram of FIG. 7. The portions same as those of FIGS. 1, 3 and 5 are denoted by the same reference numerals but are not described in detail.

The portable communication tool of this invention includes an antenna 807, a transmitter/receiver portion 502, a modulator/demodulator portion 503, a microphone 805, speakers 806a and 806b, a voice processing portion 504, a control portion 505 having a CPU 511 and a memory 512, a first display portion 801, a second display portion 802, a first drive circuit 507, a second drive circuit 508, a photodetector 306 having a first detector element 509a and a second detector element 509b, and an operation portion 510.

The operation portion corresponds to operation buttons 803 and 804 in FIG. 5.

The portable communication tool of this embodiment mode demodulates the electromagnetic waves received by the transmitter/receiver portion 502 through the antenna 807 into voice information through the modulator/demodulator portion 503. The voice information is fed to the voice processing portion 504 which executes a predetermined processing, and the voice information is converted into voice through the speakers 806a, 806b thereby to output the voice.

The information received by the transmitter/receiver portion 502 and demodulated through the modulator/demodulator portion 503, is converted into character data (received data) through the control portion 505, and is displayed on the first display portion 801 or the second display portion 802 through the first and second drive circuits 507 and 508. The information is further stored in the memory 512 in the control circuit.

Further, the voice of the user is loaded by the microphone 805 and given a predetermined processing through the voice processing portion 504, and then the voice information is fed to the modulator/demodulator portion 503. The modulator/demodulator portion 503 modulates the voice information (transmission data) that is fed into electromagnetic signals which are, then, transmitted from the antenna 807 through the transmitter/receiver portion 502.

Further, the input data from the operation portion 510 is passed through the control portion 505, and, as required, is stored in the memory 512, and is, further, fed as transmission data to the modulator/demodulator portion 503. The modulator/demodulator portion 503 modulates the input information (transmission data) that is fed into electromagnetic signals which are, then, transmitted from the antenna 807 through the transmitter/receiver portion 502.

Next, the method of operating the first display portion 801 and the second display portion 802 will be described with reference to FIGS. 7 and 9. First, described below is a method of displaying the second display portion 802.

The control portion 505 in the foldable portable telephone transmits and receives signals to and from a base station (not shown) according to a predetermined procedure, registers the position, and assumes a standby state S10.

In the standby state S10, the open/closure detector switch 812 shown in FIG. 5(A) detects at a step S100 whether the portable telephone is closed.

When closed, the control portion 505 confirms at a step S110 a change in the output of the second detector element 509b, and measures the ambient environmental data, i.e., measures the intensity of illumination on the side of the second display portion 802.

Next, when the intensity of illumination has increased on the side of the second display portion 802, i.e., when the ambient brightness has increased at a step S111, the A/D converter at a step S112 converts the intensity of illumination into a digital signal which is then input to the CPU 511 in the control portion 505. Based on the comparative data stored in the memory 512, the CPU 511 in the control portion 505 calculates the brilliance of the second display portion 802 corresponding to the intensity of illumination.

To calculate the brilliance, for example, an intensity of illumination and a brilliance of the display portion for obtaining a display having a high visibility corresponding to the intensity of illumination are stored in the memory 512 in advance. At the step S112, the stored data is compared with the intensity of illumination, and the brilliance corresponding to the intensity of illumination is output from the control portion 505 to the D/A converter, converted into an analog signal through the D/A converter, and is fed to the second drive circuit 508. Next, at a step S113, there are displayed the time, image and received information on the second display portion 802 while adjusting the brilliance of the second display portion 802 by the second drive circuit 508. When the intensity of illumination does not change at the step S111, the routine returns back to step S100.

Next, at a step S114 after the step S113, the second detector element 509b detects the intensity of illumination on the side of the second display portion (ambient brightness). When the intensity of illumination has dropped (surrounding becomes dark), lighting of the second display portion 802 is finished at a step S116. When the intensity of illumination does not change (the surrounding does not become dark), the timer function starts at a step S115. After the passage of a given period of time, the display of the second display portion 802 is finished to assume the standby state.

The second display portion 802 turns on due to a change in the intensity of illumination. It is, therefore, allowed to recognize the contents (time, with or without a transmission or reception) displayed on the second display portion 802 without cumbersome steps such as depressing the operation buttons or opening the housings.

Next, described below is a method of displaying on the first display portion 801. When the open/closure detector switch 812 detects at the step S100 the state in which the housings are not closed, i.e., the housings are opened, the first detector element detects at a step S120 the intensity of illumination on the side of the first display portion 801 (ambient brightness), and the result is converted into a digital signal through the A/D converter and is input to the control portion 505.

Based upon the digital signal that is input and the comparative data stored in the memory 512, the brilliance of the first display portion 801 having a highly visibility is calculated at a step S121 by the CPU 511 in the control portion 505. The brilliance value is converted into an analog signal through the D/A converter and is fed to the first drive circuit 507.

Then, at a step S122, the data input through the operation portion 510, data stored in the memory 512, time, image and received data are displayed on the first display portion 801.

Next, at a step S123, the open/closure detector switch detects whether the housings of the portable telephone are in a closed state. When the housings are detected to be closed, the standby state is assumed at a step S140. When it is detected at the step S123 that the housings have not been closed, the routine returns back to the step S120.

Due to the above method of operation, the brilliance of the first display portion 801 and the second display portion 802 can be controlled to meet the intensity of illumination on the sides of the display portions 801 and 802 (ambient brightness). Therefore, the visibility can be improved while suppressing the power consumption in the display portions.

The display of the second display portion 802 can be controlled depending upon the ambient brightness, i.e., depending upon a change in the intensity of illumination on the side of the second display portion 802 without operating the operating portion and, besides, the time and with or without the reception can be confirmed on the second display portion 802 without complex and cumbersome steps.

Further, the first detector element 509a and the second detector element 509b are provided on a single photodetector 306, making it possible to decrease the number of the photodetectors mounted on the portable communication tool and, hence, to fabricate a more miniature and portable communication tool suppressing the cost.

In FIG. 3, further, the photodetetor 306 is provided in the first housing 800a having the first display portion 801 and the second display portion 802, though the place of its installation is not necessary limited thereto only. The photodetector 306 may be provided in the second housing 800b having operation buttons. In this case, the photodetector can be provided inside the keyboard covered with a semitransparent cover or in the mesh-like housing provided with fine pores permitting the transmission of light.

Embodiment Mode 2

This embodiment mode explains the photodetector having a structure different from that of the embodiment mode 1, a portable communication tool having the same, and a method of displaying. In this embodiment mode, too, there is used a portable telephone as a representative example of the portable communication tools, and the same portions as those of the embodiment mode 1 are denoted by the same reference numerals but are not described in detail.

Figure 4:
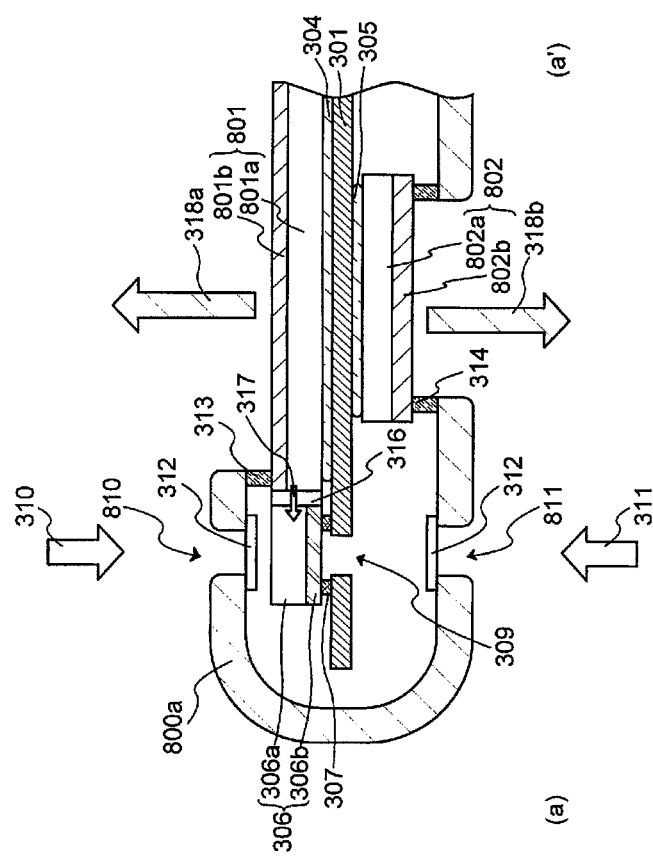
FIG. 4 is a view illustrating the embodiment mode 2 of the invention.

FIG. 4 is a sectional view of the embodiment mode along (a)-(a') of FIG. 5(B). Like in the embodiment mode 1, the first display portion 801 and the second display portion 802 are secured to the wiring substrate 301 using the adhesives 304 and 305. The first display portion 801 is formed by the substrate 801a and the light-emitting region 801b provided thereon. Similarly, the second display portion 802 is formed by the substrate 802a and the light-emitting region 802b provided thereon. The first display portion 801 emits the first light 318a and the second display portion 802 emits the second light 318b. The second display portion 802 is provided on the opposite side of the first display portion 801 via the wiring board 301.

The wiring board 301 has the through hole 309 formed between the first daylight hole 810 and the second daylight hole 811. The photodetector 306 formed by the board 306a and the light-receiving region 306b provided thereon, is provided between the first daylight hole 810 and the through hole 309. The first daylight hole 810 and the second daylight hole 811 are provided with the light-transparent cover members 312 like in the embodiment mode 1. Further, gaps among the displays of the display portions and the first housing 800a are sealed with the sealing members 313 and 314.

In this embodiment mode, the photodetector 306 is connected to the first display portion 801 by using an adhesive 316 having light-transparent property, such as an optical grease or the like. A light 317 emitted from the first display portion 801 enters into the substrate 306a of the photodetector passing through the adhesive 316 having light-transparent property.

Figure 2:
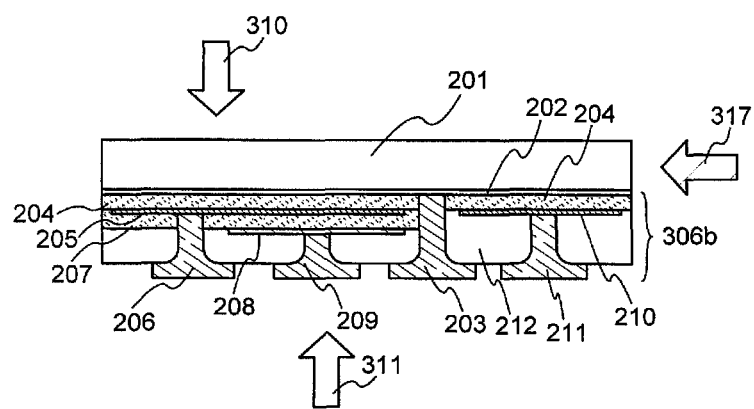
FIG. 2 is a view illustrating an embodiment mode 2 of the invention.

The photodetector 306 of this embodiment mode will be described with reference to FIG. 2. FIG. 2 is a view illustrating the photodetector 306 of FIG. 4 on an enlarged scale. It comprises a substrate 201 (corresponds to 306a in FIG. 4) having light-transparent property and a first transparent electrode 202 made of a conductive film having light-transparent property, such as ITO (indium oxide/tin oxide alloy), indium oxide/zinc oxide alloy ($In_2O_3$—ZnO) or zinc oxide (ZnO).

The first detector element for detecting the light 310 irradiated the first display portion is constituted by the first transparent electrode (polarity: plus) 202, a wiring 203 connected to the first transparent electrode 202, a first semiconductor film 204, a first metal electrode (polarity: minus) 205, and a wiring 206 connected to the first metal electrode 205. On the other hand, the second detector element for detecting the light 311 irradiated the second display portion is constituted by the first transparent electrode (polarity: plus) 202, the wiring 203 connected to the first transparent electrode, a second semiconductor film 207, a second transparent electrode (polarity: minus) 208, and a wiring 209 connected to the second transparent electrode 208. Further, the third detector element for detecting the light 317 emitted from the first display portion 801 is constituted by the first transparent electrode 202, the wiring 203 connected to the first transparent electrode, the first semiconductor film 204, a second metal electrode 210, and a wiring 211 connected to the second metal electrode. The light-receiving region 306b is constituted by the first detector element, the second detector element and the third detector element.

The first semiconductor film 204 and the second semiconductor film 207 are formed by using an amorphous silicon film, a silicon film having a PIN junction or a fine crystalline silicon film. The silicon film having a PIN junction is constituted by a p-type semiconductor layer, an n-type silicon layer, and an i-type (intrinsic) silicon layer sandwiched between the p-type silicon layer and the n-type silicon layer.

The first transparent electrode 202 is common to the first detector element, the second detector element and the third detector element.

The first detector element detects the brightness (intensity of illumination) of the light 310 irradiated the first display portion. The second detector element detects the brightness (intensity of illumination) of the light 311 irradiated the second display portion. The third detector element detects the brilliance of the light 317 emitted from the first display portion. Provision of the first metal electrode 205 between the first detector element and the second detector element does not permit the leakage of light between the detector elements.

As shown in FIG. 4, the first display portion 801 and the photodetector 306 are connected together with the adhesive 316 having light-transparent property. Therefore, the light 317 emitted from the first display portion enters into the photodetector 306 through the substrate 801a or the light-emitting region 801b of the first display portion and the adhesive 316, enabling the third detector element to detect the brilliance of the first display portion 801.

Figure 11:
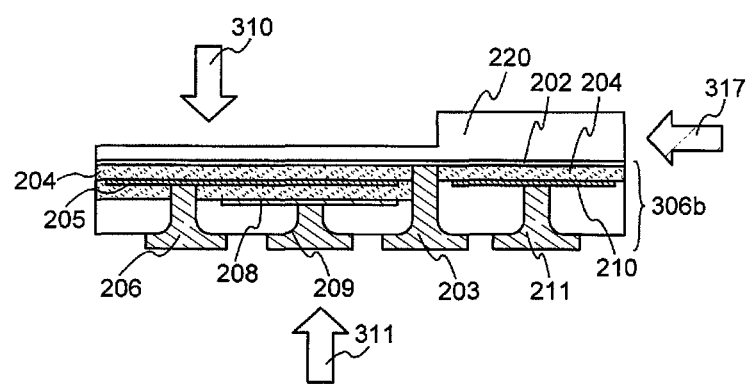
FIG. 11 is a view illustrating the embodiment mode 2 of the invention.

The light 317 emitted from the first display portion is transmitted to the substrate 306a of the photodetector through the substrate 801a or the light-emitting region 801b and the adhesive 316 having light-transparent property, and the brilliance is detected by the third detector element. Here, in order that this light will not enter into the first detector element, a portion of a substrate 220 where the first detector element and the second detector element are formed may be cut away as illustrated in FIG. 11. This can prevent erroneous detection such that the light in which the light 317 emitted from the first display portion is interfered enters into these detector elements. Other constituent portions in FIG. 11 are the same as those of FIG. 2, and are denoted by the same reference numerals.

Figure 8:
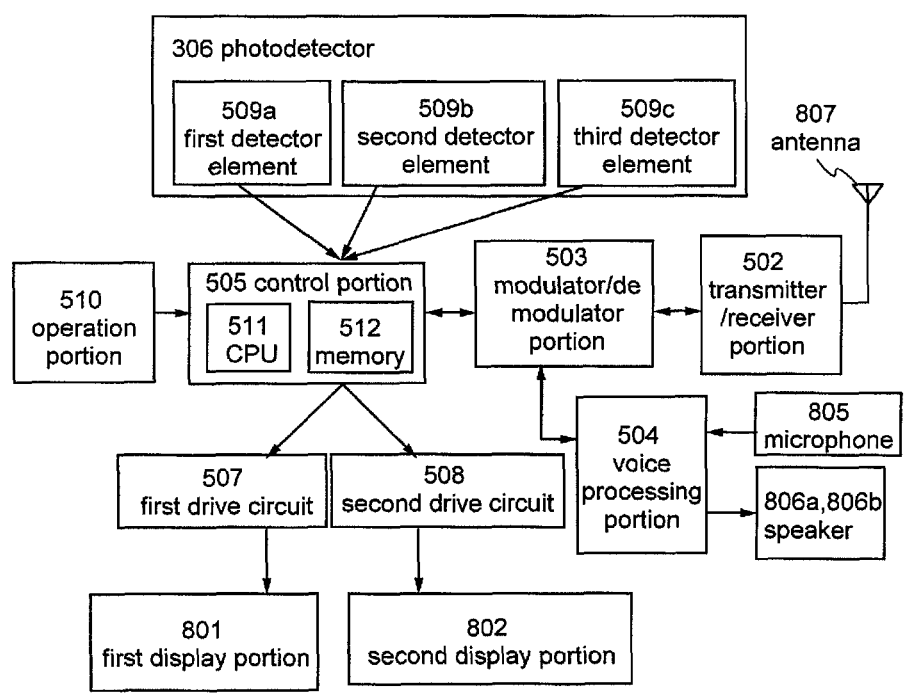
FIG. 8 is a view illustrating the embodiment mode 2 of the invention.

The construction of the portable telephone of the embodiment mode will be described with reference to a block diagram of FIG. 8. The same portions as those of FIGS. 2, 4 and 5 are denoted by the same reference numerals but are not described in detail.

The portable telephone of this invention includes, like in the embodiment mode 1, an antenna 807, a transmitter/receiver portion 502, a modulator/demodulator portion 503, a microphone 805, speakers 806a and 806b, a voice processing portion 504, a control portion 505 having a memory 512 and a CPU 511, a first display portion 801, a second display portion 802, a first drive circuit 507, a second drive circuit 508, a photodetector 306, and an operation portion 510. The photodetector 306 includes a first detector element 509a, a second detector element 509b and a third detector element 509c. The third detector element 509c measures the light 317 emitted from the first display portion to detect the amount of change in the brilliance due to the deterioration of the EL light-emitting element in the display portion or due to the deterioration in the back light of the liquid crystal panel.

In this embodiment mode, the electromagnetic waves are transmitted and received by using the antenna 807 and the transmitter/receiver portion 502, voice is converted and is input and output through the modulator/demodulator portion 503, and data obtained by the transmission and reception of electromagnetic waves are stored in the memory 512, in the same manner as in the embodiment mode 1.

Figure 12A:
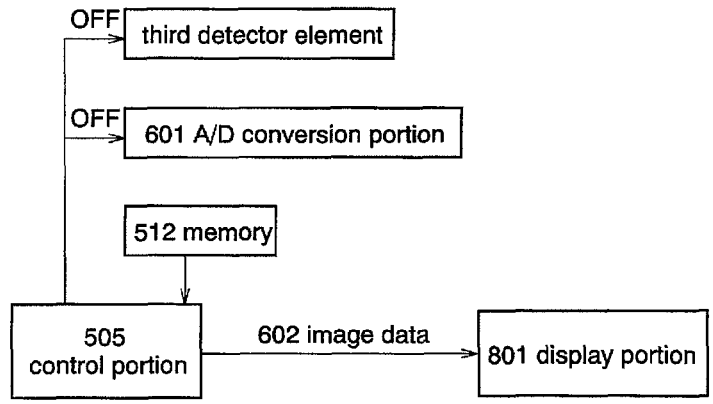
FIGS. 12(A) and 12(B) are views illustrating the embodiment mode 2 of the invention.

Described below is a method of operation for correcting the brilliance of the first display portion 801 by using the photodetector 306 of the invention. FIGS. 12(A) and (B) show block diagrams including a memory 512 storing the brilliance data, a detector element, a control portion 505, a first display portion 801 to which image data is put, and an A/D conversion portion 601. The detector element used here is the third detector element 509c in FIG. 8.

First, described with reference to FIG. 12(A) is a state where the housings of the potable telephone are opened. Here, such data of a state where the housings of the portable telephone are not folded, i.e., a state where they are opened has been input to the control portion 505.

In this case, the third detector element 509c and the A/D conversion portion 601 are turned off, and an image data 602 are input from the control portion 505 to the first display portion 801 to display information.

Next, when the portable telephone is in the folded state, i.e., is in the closed state, such data that the housings are closed is input to the control portion 505.

Figure 12B:
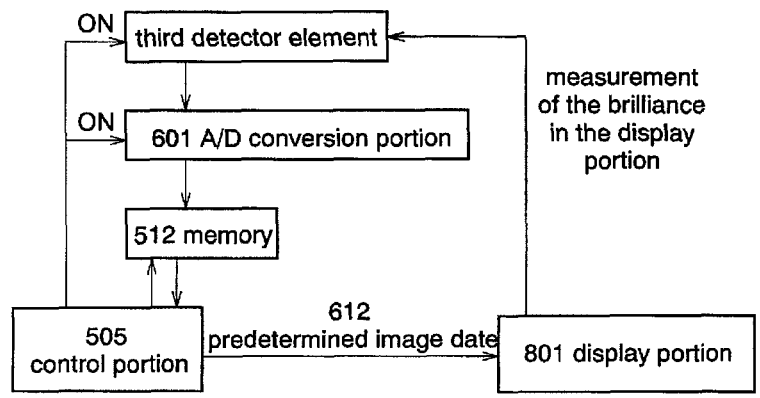

Next, as shown in FIG. 12(B), data (a predetermined image data 612) for producing a predetermined display are input to the first display portion 801 from the control portion 505. The predetermined display is to produce a monochromatic display of white color or RGB on the whole screen. Further, a signal that makes the third detector element 509a and the A/D conversion portion 601 turn on is input from the control portion 505 and these become on-state. Next, the brilliance of the first display portion 801 is measured by the third detector element 509*c*. Depending upon the amount of change in the brilliance, the brilliance data that is measured is input to the memory 512 in the control portion 505 through the A/D conversion portion 601.

The brilliance data that is measured is used to learn the state of the deterioration of the EL light-emitting element and the backlight by seeking the amount of change from the brilliance data of the previous time stored in the memory 512. Therefore, the control portion 505 calculates a correction value (current value, voltage value) for correcting the brilliance that has dropped due to the deterioration, and the value for correcting the brilliance is stored in the memory 512.

After the measurement of the brilliance, the third detector element 509*c* and the A/D conversion portion 601 are turned off, and the input of the predetermined image data 612 is turned off to the first display portion from the control portion.

Next, when the information is to be displayed by the first display portion 801, the brilliance of the display portion is adjusted by the above value for correcting the brilliance to produce a display maintaining a highly visibility.

Figure 10:
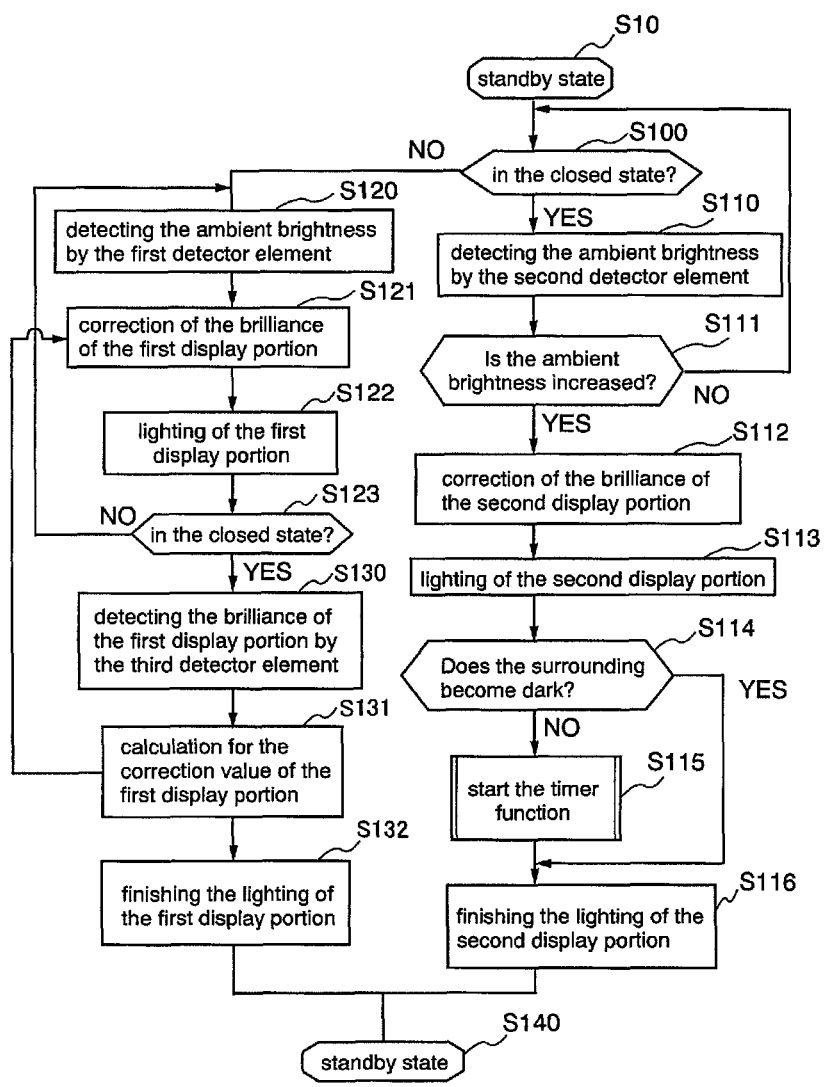
FIG. 10 is a view illustrating the embodiment mode 2 of the invention.

Next, described with reference to FIG. 10 is a method of operating the first display portion 801 and the second display portion 802 according to the embodiment mode.

Figure 9:
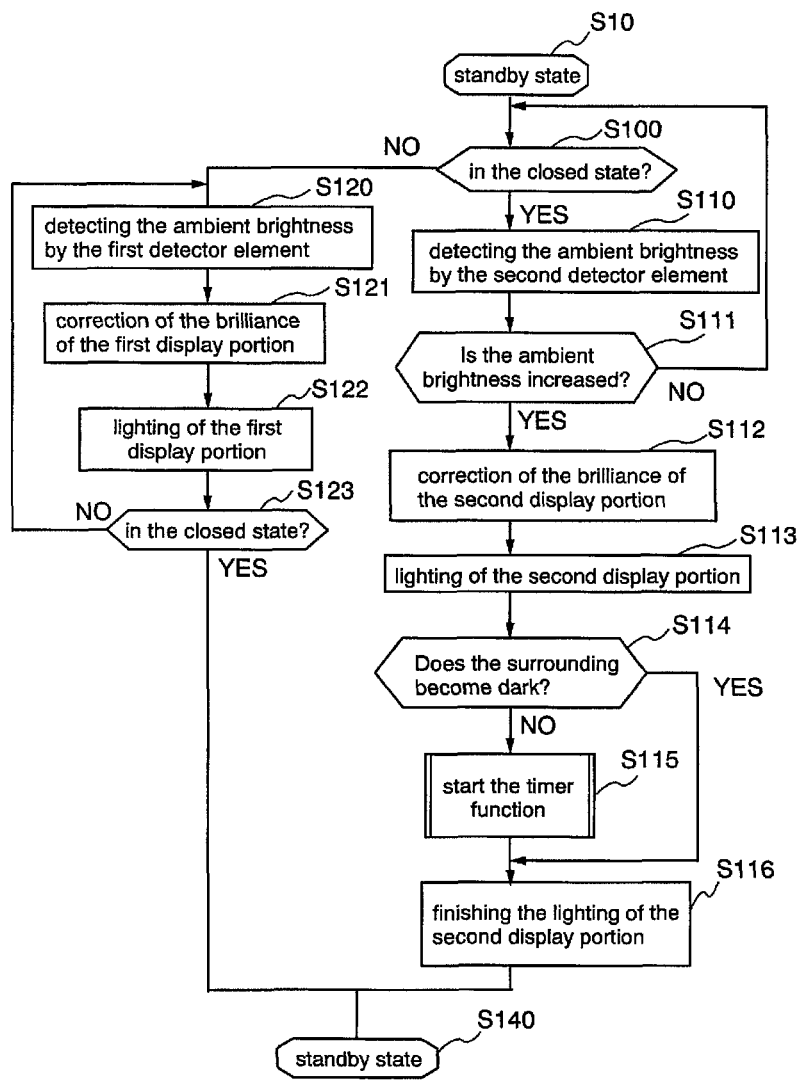
FIG. 9 is a view illustrating the embodiment mode 1 of the invention.

In this embodiment mode, the method of operating the second display portion 802 from the standby state S10 through the step S100 to the step S116 is the same as that of the embodiment mode 1 illustrated in FIG. 9. Further, the method of operating the first display portion 801 from the step S120 up to the step S122 is the same as that of the embodiment mode 1 illustrated in FIG. 9.

At the step S123 after the step S122, the open/closure detector switch 812 in FIG. 5 judges whether the portable telephone is in the closed state. Here, when it is judged that the housings of the portable telephone are in the closed state, the brilliance is measured at a step S130 as shown in FIG. 12(B), whereby the predetermined image data are input to the first display portion 801, and the brilliance of the first display portion 801 of when the predetermined display is produced is detected by the third detector element 509*c* to obtain brilliance data.

Next, the brilliance data is converted into a digital signal through the A/D converter, and is input to the CPU 511 in the control portion 505.

Then, at a step S131, a brilliance correction value for correcting the brilliance of the first display portion 801 is calculated based on the comparative data that has been input in advance and the brilliance data that is measured. The brilliance correction value is converted into an analog signal and is, then, stored in the memory 512 in the control portion.

Then, at a step S132, the predetermined display finishes on the first display portion, and the standby state is assumed at the step S140.

Next, when the image is to be displayed on the first display portion 801 or, concretely, during the operation at the step S120 through the step S122, the brilliance of the first display portion 801 is controlled to produce a display at the step S121 by taking into consideration the above brilliance correction value together with the illumination data obtained by the first detector element 509*a*.

When the open/closure detector switch 812 judges at the step S123 that the housings of the portable telephone are not in the closed state, the routine returns back to the step S120.

The step S130 to the step S132 may be executed for every opening/closure of the portable telephone or at regular intervals.

The EL display device has a problem in that the light-emitting material undergoes a chemical change due to environmental stress such as humidity and temperature, causing brilliance to be deteriorated and imposing limitation on the quality of display and life of the product. The liquid crystal display, too, has a problem in that the display becomes dark due to the deterioration of the backlight with age.

By using the photodetector of the invention, however, the brightness of the first display portion 801 can be controlled depending upon the deterioration of the EL display device or the backlight and upon the ambient brightness, and there is fabricated a foldable portable communication tool which is easy to watch consuming electric power in small amounts.

In this embodiment mode, further, a single photodetector can be provided with the first detector element 509*a*, second detector element 509*b* and third detector element 509*c*, making it possible to decrease the number of parts to be mounted. As a result, the foldable communication tool is realized in a small size.

Embodiment Mode 3

This embodiment mode explains about the foldable portable communication tool having the photodetector installed at a different place. This embodiment mode, too, deals with a portable telephone as a representative example of the portable communication tools, and the same portions as those of the embodiment mode 1 are denoted by the same reference numerals but are not described in detail.

In this embodiment mode, described is a portable telephone in which the second housing of the portable telephone is provided with the photodetector including the detector element for controlling the brilliance of the first display portion and the detector element for detecting the intensity of illumination on the side of the display portion, which are connected in parallel.

Figures 6A, 6B:
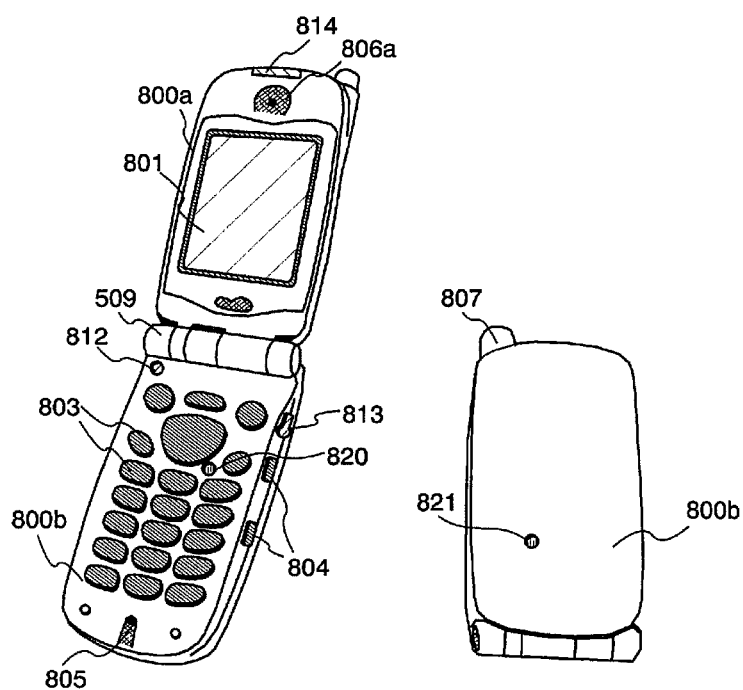
FIGS. 6(A) and 6(B) are views illustrating an embodiment mode 3 of the invention.

FIG. 6 is a view schematically illustrating the foldable portable telephone according to the present invention, wherein FIG. 6(A) is a perspective view in an open state, and FIG. 6(B) is a perspective view in a closed state and the perspective view viewing from the side of the second housing 800*b* where the second display portion has not been provided.

Like in the embodiment mode 1, the two housings 800*a* and 800*b* are connected together via the hinge 509.

The first housing 800*a* includes the first display portion 801, the second display portion (not shown), the speaker 806*a*, the antenna 807, the camera lens (not shown) and the lamp 814.

The second housing 800*b* includes the operation buttons 803, the operation buttons 804 provided on the side surface of the portable telephone, the microphone 805, the open/closure detector switch 812, the headphone terminal cover 813, a first daylight hole 820 and a second daylight hole 821.

In this embodiment mode, the first daylight hole 820 and the second daylight hole 821 are formed in the front and back surfaces at the same place of the second housing. The daylight holes are provided with light-transparent covers like those of the region 312 of FIG. 3 and the region 312 of FIG. 4. Between the first daylight hole 820 and the second daylight hole 821, there is provided the photodetector having a plurality of detector elements connected in parallel as illustrated in FIG. 1.

Figure 7:
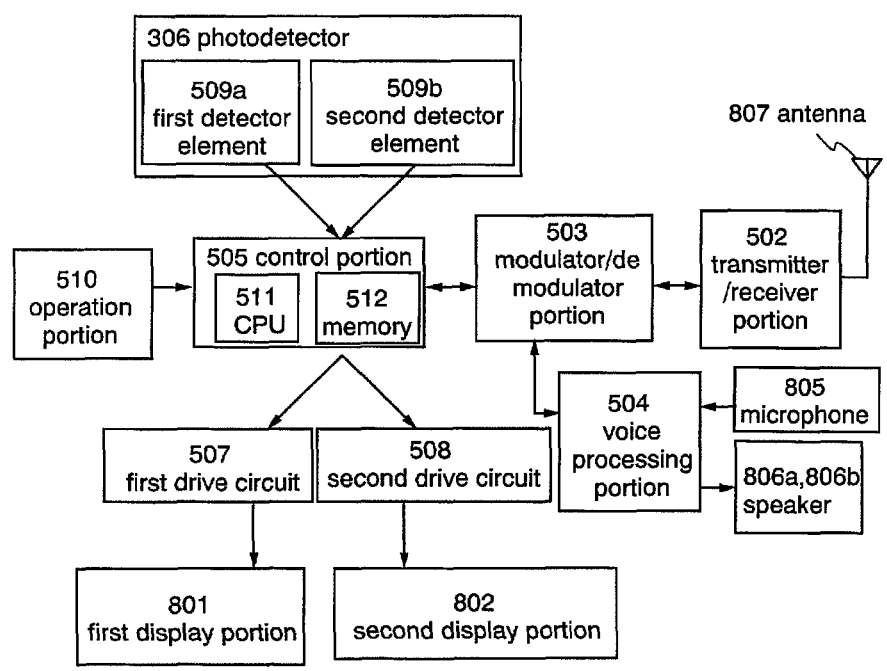
FIG. 7 is a view illustrating the embodiment mode 1 of the invention.

The portable telephone of this embodiment mode has a structure as shown in FIG. 7. Its details are as described in the embodiment mode 1 and are not described here. Here, the first detector element 509*a* detects the intensity of illumination on the side of the first display portion (ambient brightness) when the housings of the portable telephone are opened. When the housings of the portable telephone are closed, further, the first display portion 801 produces a predetermined display, and the brilliance at this moment is detected. On the other hand, the second detector element 509b detects the intensity of illumination on the side of the second display portion (ambient brightness) of when the portable telephone is closed.

The operation method of controlling the brilliance of the first display portion by using the first detector element may be used the method illustrated in FIGS. 12(A) and (B). Its details are described in the embodiment mode 2 and are not described here. In this case, the embodiment mode uses the first detector element 509a instead of the third detector element 509c used in the embodiment mode 2.

The method of displaying in this embodiment mode may be used the method illustrated in FIG. 10. Its details are described in the embodiment mode 2 and are not described here. In this embodiment mode, the third detector element described at the step S130 in FIG. 10 is the one same as the first detector element 509a used at the step S120.

The photodetector is provided between the first daylight hole 820 and the second daylight hole 821. When the pads of operation buttons have light-transparent property, however, the detector may be provided under the operation buttons. The daylight holes 820 and 821 may not be the holes shown in FIG. 6 but may be those provided inside the housings 800a and 800b which are provided with fine apertures to transmit light. When the housing having the photodetector is made of a material having light-transparent property, there is no need of forming holes such as daylight holes or fine apertures.

Embodiment Mode 4

This embodiment mode explains about a portable communication tool having a display device capable of producing a display on both surfaces thereof with reference to FIGS. 1, 5, 13, 15(A), 15(B), 16(A) and 16(B). This embodiment mode, too, deals with a portable telephone as a representative example of the portable communication tools, and the same portions as those of the embodiment mode 1 are denoted by the same reference numerals but are not described in detail.

Figure 13:
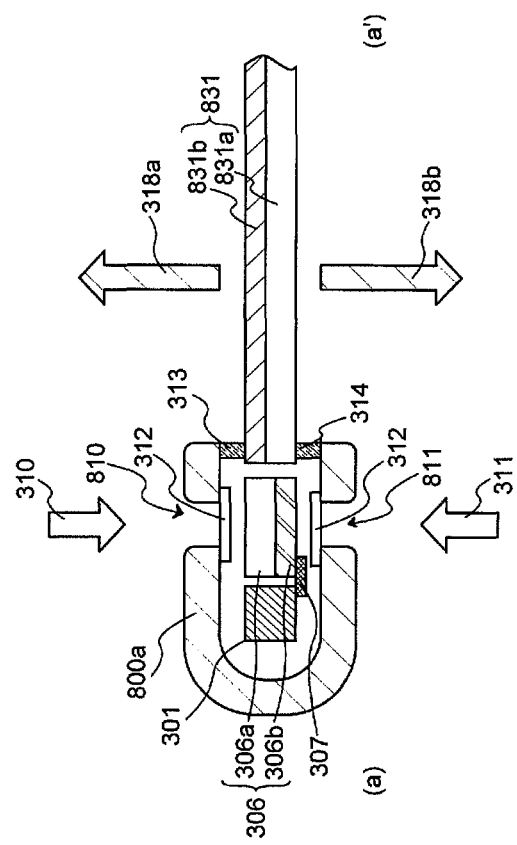
FIG. 13 is a view illustrating an embodiment mode 4 of the invention.

This embodiment mode uses a display device 831 (a substrate 831a having light-transparent property, a light-emitting region 831b provided thereon) capable of producing a display on both surfaces thereof as shown in FIG. 13 instead of using two display devices as the first display portion 801 and the second display portion 802 of the embodiment mode 1. When the first housing 800a and the second housing 800b are opened, the display device displays image information that can be recognized on the first display portion. When the first housing 800a and the second housing 800b are closed, the display device displays image information that can be recognized on the second display portion. In this embodiment mode like in the embodiment mode 2, the display portion facing the operation portion (803 in FIG. 5) assumes the first display buttons (801 in FIG. 5), and the display portion on the opposite side of the first display portion assumes the second display portion (802 in FIG. 5). In the embodiment mode 1 without using the display device 831 which can produce a display on both surfaces thereof, the wiring board 301 can be arranged between the first display portion 801 and the second display portion 802 as shown in FIG. 3. In this embodiment mode, however, the wiring board 301 is arranged beside the photodetector 306 so as not to disturb the display.

The photodetector 306 of this embodiment mode has two detector elements shown in FIG. 1 connected in parallel as in the embodiment mode 1. Here, the first detector element detects the brightness (intensity of illumination) of the light 310 irradiated the first display portion side 801, and the second detector element detects the brightness (intensity of illumination) of the light 311 irradiated the second display portion side 802.

When it is judged by the open/closure detector switch 812 of FIG. 5 that the first housing 800a and the second housing 800b are opened, the photodetector 306 (formed by the substrate 306a having light-transparent property and the light-receiving region 306b provided thereon) detects the brightness (intensity of illumination) of the light 310 irradiated the side of the first display portion. Then, based on the result of detection, the display device 831 capable of producing a display on both surfaces emits a first light 318a to the side of the first display portion 800a to display image information that can be recognized on the first display portion.

Similarly, when it is judged that the two housings 800a and 800b are closed, the photosensor 306 detects the brightness (intensity of illumination) of the light 311 irradiated the side of the second display portion. Then, based on the result of detection, the display device 831 capable of producing a display on both surfaces emits a second light 318b to display image information that can be recognized on the second display portion 802.

In this embodiment mode, too, the operation buttons are made of a material having the light-transparent property and thereby the photodetector 306, which is formed by the substrate 306a having the light-transparent property and the light-receiving region 306b provided thereon, may be installed under the operation buttons (803 in FIG. 5). In this case, when the first housing 800a and the second housing 800b are closed as shown in the embodiment mode 3, the brilliance of the display device 831 capable of displaying a predetermined image and producing a display on both surfaces thereof is detected. Next, when the image information is displayed, which can be recognized from the first display portion 801 or the second display portion 802, the brilliance of the display device 831 capable of producing a display on both surfaces thereof can be controlled based on the detected result of brilliance and the intensities of illumination on the sides of the display portions.

Figure 15A:
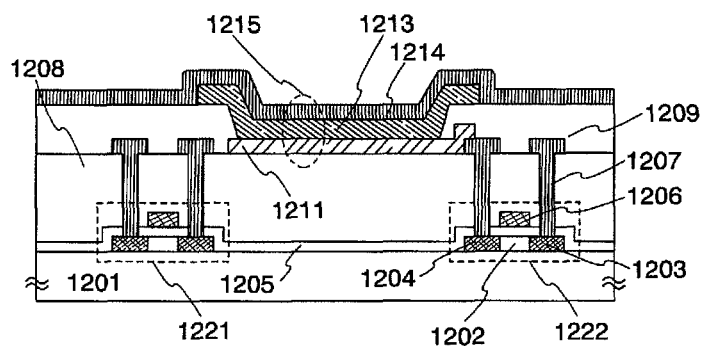
FIGS. 15(A) and 15(B) are views illustrating the embodiment mode 4 of the invention.
Figure 15B:
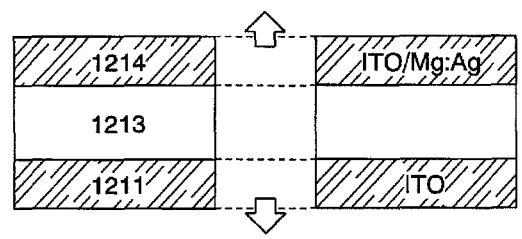

Next, described with reference to FIGS. 15(A) and 15(B) is the structure of a light-emitting element in the pixel portion of the display device capable of emitting light from both surfaces thereof. FIG. 15(A) illustrates in cross section the structure of the light-emitting element in the pixel portion of the display device 831 capable of producing a display on both surfaces thereof, and FIG. 15(B) illustrates the element structure of the light-emitting element. The light-emitting element shown here is formed by a first electrode electrically connected to a current control TFT and a second electrode formed by sandwiching a layer containing a light-emitting substance.

In FIG. 15(A), a thin-film transistor (TFT) is formed over a substrate 1201. Illustrated here are a current control TFT 1222 electrically connected to a first electrode 1211 of a light-emitting element 1215 and having a function for controlling the current fed to the light-emitting element 1215, and a switching TFT 1221 for controlling video signals applied to the gate electrode of the current control TFT 1222.

As the substrate 1201 having light shielding property, there can be used a glass substrate, a quartz substrate, a resin substrate or a flexible substrate material (plastics). Further, the active layer of each TFT includes at least a channel-forming region 1202, a source region 1203 and a drain region 1204.

Further, the active layer of each TFT is covered with a gate-insulating film 1205, and a gate electrode 1206 is formed overlapping the channel-forming region 1202 via the gate-insulating film 1205. Further, an interlayer insulating film 1208 is provided covering the gate electrode 1206. As the material forming the interlayer insulating film 1208, there can be used an insulating film containing silicon such as silicon oxide, silicon nitride or silicon oxynitride, or an organic resin film such as of polyimide, polyamide, acryl (inclusive of photosensitive acryl), or BCB (benzocyclobutene), etc.

Next, over the interlayer insulating film 1208, there are formed a wiring 1207 electrically connected to the source region 1203 of the current control TFT 1222 and the first electrode 1211 electrically connected to the drain region 1204. When the first electrode 1211 is an anode, it is desired to form the current control TFT 1222 in the p-channel type. When the first electrode is a cathode, it is desired to form the current control TFT 1222 in the n-channel type.

An insulating layer 1209 is formed covering the end of the first electrode 1211, the wiring 1207 and the like. Next, a layer 1213 containing a light-emitting substance is formed over the first electrode 1211, and a second electrode 1214 is formed thereon to complete the light-emitting element 1215.

In this embodiment mode, the materials of the first electrode 1211 and the second electrode 1214 can be arbitrarily selected. To form an electrode that works as the anode, in general, it is desired to use a conductive material having a large work function (e.g., a work function is 4.0 eV or more). To form an electrode that works as the cathode, in general, it is desired to use a conductive material having a small work function (e.g., a work function is 3.5 eV or less). To form an electrode that transmits light emitted from the layer 1213 containing the light-emitting substance, there is a need that the first or second electrodes 1211 or 1214 is formed by using a material having light-transparent property. By forming the both electrodes using a light-transparent material, there is formed a light-emitting element capable of emitting light from the both electrodes.

In the light-emitting element shown in FIG. 15(A), further, positive holes are injected from the electrode serving as the anode into the layer 1213 that contains the light-emitting substance, and electrons are injected from the electrode serving as the cathode into the layer 1213 containing the light-emitting substance. Light is emitted as the positive holes and electrons recombine in the layer 1213 containing the light-emitting substance.

The layer 1213 containing the light-emitting substance includes at least a light-emitting layer, and is formed by combining and laminating any one of a layer having a different function for the carrier, such as a positive hole injection layer, a positive hole transporting layer, a blocking layer, an electron transporting layer or an electron injection layer, or a plurality of layers.

As a material for forming the layer 1213 containing the light-emitting substance, there can be used known organic compound having a low molecular weight, a high molecular weight or an intermediate molecular weight. Representative examples of the organic compound having an intermediate molecular weight will include a dendolimer, an oligomer and the like.

Materials described below can be concretely used as the material for forming the layer 1213 that contains the light-emitting substance.

Porphyrin-based compounds are effective as a positive hole injection material for forming the positive hole injection layer, in the case of an organic compound and, for example, phthalocyanine (hereinafter referred to as $H_2$-Pc), copper phthalocyanine (hereinafter referred to as Cu—Pc), or the like may be used. A material that chemical doping is treated to a conductive high molecular compound can be also used, and polyethylene dioxythiophene (hereinafter referred to as PEDOT) doped with polystyrene sulfonate (hereinafter referred to as PSS), polyaniline, polyvinyl carbazole (hereinafter referred to as PVK), and the like can be given.

As the positive hole transporting material used for forming the positive hole transporting layer, an aromatic amine-based (that is, compound having a benzene ring-nitrogen bond) compound is preferred. Widely used materials include, for example, in addition to a TPD, derivatives thereof such as 4,4'-bis[N-(1-naphthyl)-N-phenyl-amino]-biphenyl (hereafter, referred to as "α-NPD"). Also used are star burst type aromatic amine compounds, including: 4,4', 4"-tris(N,N-diphenyl-amino)-triphenyl amine (hereafter, referred to as "TDATA"); and 4,4',4"-tris[N-(3-methylphenyl)-N-phenyl-amino]-triphenyl amine (hereafter, referred to as "MTDATA").

Specific examples of the light-emitting material used for forming the light-emitting layer include metal complexes such as tris(8-quinolinolato) aluminum (hereafter, referred to as $Alq_3$), tris(4-methyl-8-quinolinolato) aluminium (hereafter, referred to as $Almq_3$), and bis(10-hydroxybenzo[h]-quinolinato) beryllium (hereafter, referred to as $BeBq_2$), and bis(2-methyl-8-quinolinolato)-(4-hydroxy-biphenylyl)-aluminum (hereafter, referred to as BAlq), bis[2-(2-hydroxyphenyl)-benzoxazolate]zinc (hereafter, referred to as $Zn(BOX)_2$) and bis[2-(2-hydroxyphenyl)-benzothiazolate] zinc (hereafter, referred to as $Zn(BTZ)_2$). Also, various fluorescent dyes may be effective. Triplet electroluminescence materials may be also used and main examples thereof include complexes with platinum or iridium as a central metal. Known triplet electroluminescence materials include tris(2-phenylpyridine) iridium (hereafter, referred to as $Tr(ppy)_3$), 2, 3, 7, 8, 12, 13, 17, 18-octaethyl-21H, 23H-porphyrin-platinum (hereafter, referred to as PtOEP) or the like.

Metal complexes are often used as the electron transporting material for forming the electron transporting layer. Preferred examples thereof include: metal complexes having a quinoline skeleton or benzoquinoline skeleton, such as the aforementioned $Alq_3$, $Almq_3$, $BeBq_2$; and mixed ligand complexes such as Balq. Other examples include metal complexes having oxazole-based and thiazole-based ligands such as $Zn(BOX)_2$ and $Zn(BTZ)_2$. Other than metal complexes, materials that are capable of transporting electrons are: oxadiazole derivatives such as 2-(4-biphenyl)-5-(4-tert-butylphenyl)-1,3,4-oxadiazole (hereafter referred to as PBD), and 1,3-bis[5-(p-tert-butylphenyl)-1,3,4-oxadiazole-2-yl]benzene (hereafter, referred to as OXD-7); triazole derivatives such as 3-(4-tert-butylphenyl)-4-phenyl-5-(4-biphenylyl)-1,2,4-triazole (hereafter, referred to as TAZ) and 3-(4-tert-butylphenyl)-4-(4-ethylphenyl)-5-(4-biphenylyl)-1,2,4-triazole (hereafter, referred to as p-EtTAZ); and phenanthroline derivatives such as bathophenanthroline (hereafter, referred to as Bphen) and bathocuproin (hereafter, referred to as BCP).

In addition, in a case where the blocking layer is included, the above-mentioned Balq, OXD-7, TAZ, p-EtTAZ, Bphen, BCP, and the like are effective as positive hole blocking materials for forming the blocking layer because of their high excitation energy level.

FIG. 15(B) illustrates a constitution in a case where the first electrode 1211 and the second electrode 1214 which are both formed by using a light-transparent material, the first electrode 1211 serving as the anode and the second electrode 1214 serving as the cathode. In this case, the first electrode 1211 can be formed by using an indium oxide/tin (ITO) film, a transparent conductive film mixed zinc oxide (ZnO) in an amount of 2 to 20 [%] into indium oxide, or a transparent conductive film such as IZO or $In_2O_3$—ZnO. The second electrode 1214 can be formed by laminating Mg:Ag (an alloy of magnesium and silver) having a small work function and ITO. In this case, light emitted from the layer 1213 containing the light-emitting substance is emitted from both surfaces of the first electrode 1211 and the second electrode 1214. The material forming the layer 1213 containing the light-emitting substance may be arbitrarily selected from the materials exemplified above and used.

Figure 16A:
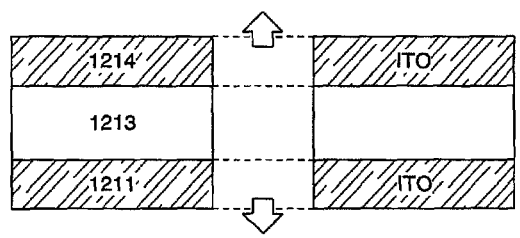
FIGS. 16(A) and 16(B) are views illustrating the embodiment mode 4 of the invention.
Figure 16B:
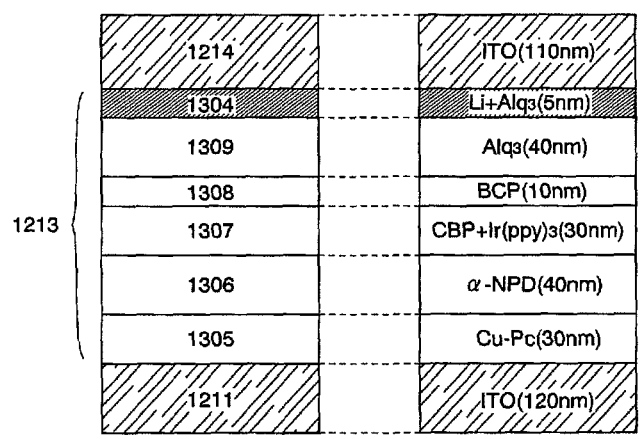

Concerning the light-emitting element capable of emitting light from both the first electrode 1211 and the second electrode 1214, described with reference to FIGS. 16(A) and 16(B) is an element of a constitution different from the constitution illustrated in FIG. 15(B).

As shown in FIG. 16(A), the first electrode 1211 and the second electrode 1214 are both formed by using an ITO though they are serving as the anode and the cathode, respectively. In this case, however, a feature resides in the structure of the layer 1213 containing the light-emitting substance. Namely, the layer containing the light-emitting substance formed in contact with the second electrode 1214 serving as the cathode, includes a doping layer 1304 doped with an alkali metal such as Li or Cs having a small work function. This makes it possible to decrease the work function of the layer 1213 containing the light-emitting substance on the cathode side. Therefore, the function of the cathode can be exhibited even when the ITO is used as the electrode material of the second electrode 1214 that serves as the cathode.

FIG. 16(B) illustrates the case where the layer 1213 containing the light-emitting substance is formed by laminating a positive hole injection layer 1305, a positive hole transporting layer 1306, a light-emitting layer 1307, a blocking layer 1308, an electron transporting layer 1309 and the doping layer 1304. The laminate structure can be formed by arbitrarily selecting the above-mentioned materials except forming the doping layer in the layer 1213 that contains the light-emitting substance in contact with the second electrode 1214. On the right side of FIG. 16(B), there are illustrated an example of materials used as layers and their film thickness.

In a case where a full color display is carried out by the display device 831 capable of being displayed on both surfaces in this embodiment mode, layers of materials that emit red light, green light and blue light may be arbitrarily and selectively formed into the layer 1213 containing the light-emitting substance by an evaporation method using an evaporation mask or an ink jet method. Or, the layer containing the light-emitting substance may be the one that emits light of white color, and a full color display may be accomplished by separately providing color filters or color conversion layers.

By using a display device capable of emitting light from both surfaces thereof as in this embodiment mode, it is allowed to decrease the number of the display devices, to decrease the number of components such as detectors and display devices and, hence, to decrease the cost of production. Besides, the size can be further decreased as compared to the portable communication tools shown in the embodiment mode 1 to the embodiment mode 3.

Embodiment Mode 5

Figure 14:
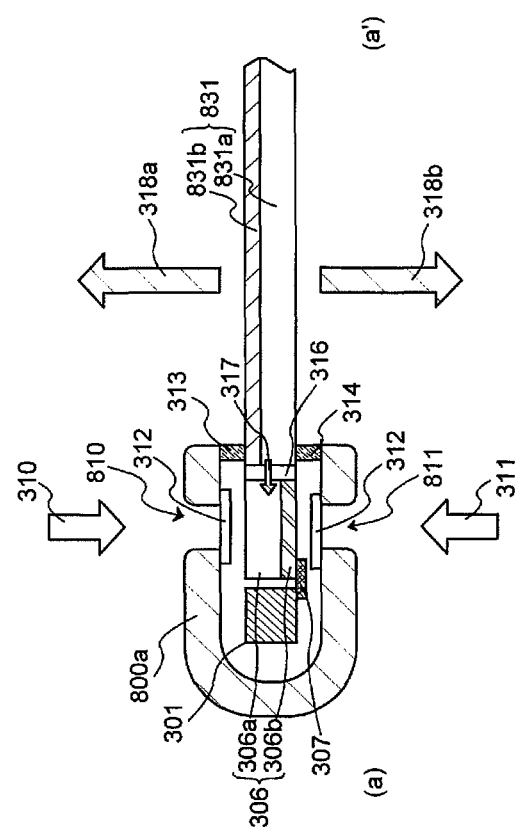
FIG. 14 is the view illustrating the embodiment mode 4 of the invention.

This embodiment mode explains about the portable communication tool having the display device capable of producing a display on both surfaces thereof as shown in FIG. 14, with reference to FIGS. 2, 5 and 14. This embodiment mode, too, deals with the portable telephone as a representative example of the portable communication tools, and the portions same as those of the embodiment mode 2 are denoted by the same reference numerals but are not described in detail.

This embodiment mode uses the display device 831 (constituted by the substrate 831a having light-transparent property and the light-emitting region 831b provided thereon) capable of producing a display on both surfaces thereof instead of using the two display portions 801 and 802 employed as display portions in the embodiment mode 2. In this embodiment mode like in the embodiment mode 2, the display portion facing the operation portion (803 in FIG. 5) is the first display portion, the first light emitted from this side is denoted by 318a, and image information that can be recognized can be displayed by using the above light. Further, the display portion on the opposite side of the first display portion is the second display portion, and the second light 318b is emitted from this side to display image information that can be recognized.

Further, like in the embodiment mode 2, the photodetector (306 of FIG. 14. The photodetector 306 is formed by the substrate 306a having light-transparent property and the light-receiving region 306b provided thereon) of this embodiment mode includes three detector elements connected in parallel as shown in FIG. 2. Here, the first detector element detects the brightness (intensity of illumination) of the light 310 irradiated the first display portion, the second detector element detects the brightness (intensity of illumination) of the light 311 irradiated the second display portion, and the third detector element detects the brilliance of the light 317 emitted by the display device 831.

As shown in FIG. 14, the photodetector 306 of this embodiment mode is connected to the display device 831 capable of producing a display on both surfaces thereof by using the adhesive 316 having light-transparent property. Therefore, light of the display device 831 capable of producing a display on both surfaces thereof enters into the photodetector 306 through the substrate 831a or the light-emitting region 831b of the display device and the adhesive 316. Therefore, the third detector element can detect the brilliance of the light 317 emitted from the display device 831 which is capable of producing a display on both surfaces thereof.

When it is detected by the open/closure detector switch 812 of FIG. 5 that the first housing 800a and the second housing 800b are opened, the photodetector 306 detects the intensity of illumination of the light 310 irradiated the side of the first display portion. Further, the third detector element detects the brilliance of the light 317 emitted from the display device 831 capable of producing a display on both surfaces thereof. Then, the display device 831 emits the first light 318a onto the first display portion to display image information based upon the detected results of the intensity of illumination on the side of the first display portion and of the brilliance of the display device 831 capable of producing a display on both surfaces thereof.

Similarly, when it is judged that the two housings are closed, the photodetector 306 detects the brightness (intensity of illumination) of the light 311 on the side of the second display portion. Then, based on the result of detection, the display device 831 emits the second light 318b on the side of the second display portion to display image information that can be recognized.

The display device capable of producing a display on both surfaces thereof was described in the embodiment mode 4, and is not described here.

By using a display device capable of emitting light from both surfaces thereof as in this embodiment mode, it is allowed to decrease the number of components such as detectors and display devices and, hence, to decrease the cost of production. Besides, the size can be further decreased as compared to the portable communication tools shown in the embodiment mode 1 to the embodiment mode 3.

What is claimed is:

1. A photodetector comprising:
   a substrate;
   a first electrode over the substrate;
   a first semiconductor film over the first electrode;
   a second electrode over the first semiconductor film;
   an insulating film over the second electrode, the insulating film comprising an organic resin;
   a first wiring over the insulating film, wherein the first wiring is in direct contact with the first electrode; and
   a second wiring over and in direct contact with a top surface of the insulating film, wherein the second wiring is in direct contact with the second electrode,
   wherein the first electrode is capable of shielding light, so that the photodetector does not detect light passing through the first electrode.

2. A photodetector comprising:
   a substrate;
   a first electrode over the substrate;
   a first semiconductor film over the first electrode;
   a second electrode over the first semiconductor film;
   a second semiconductor film over the second electrode;
   a third electrode over the second semiconductor film;
   an insulating film over the second electrode and the third electrode, the insulating film comprising an organic resin;
   a first wiring over the insulating film, wherein the first wiring is in direct contact with the first electrode;
   a second wiring over the insulating film, wherein the second wiring is in direct contact with the second electrode; and
   a third wiring over and in direct contact with a top surface of the insulating film, wherein the third wiring is in direct contact with the third electrode,
   wherein the second electrode is capable of shielding light, so that the photodetector does not detect light passing through the second electrode.

3. A photodetector comprising:
   a substrate;
   a first electrode over the substrate;
   a first semiconductor film over the first electrode;
   a second electrode over the first semiconductor film;
   a second semiconductor film over the first electrode;
   a third electrode over the second semiconductor film;
   an insulating film over the second electrode and the third electrode, the insulating film comprising an organic resin;
   a first wiring over the insulating film, wherein the first wiring is in direct contact with the first electrode;
   a second wiring over the insulating film, wherein the second wiring is in direct contact with the second electrode; and
   a third wiring over and in direct contact with a top surface of the insulating film, wherein the third wiring is in direct contact with the third electrode,
   wherein the second electrode is capable of shielding light, so that the photodetector does not detect light passing through the second electrode.

4. A photodetector comprising:
   a substrate;
   a first electrode over the substrate;
   a first semiconductor film over the first electrode;
   a second electrode over the first semiconductor film;
   a second semiconductor film over the first electrode;
   a third electrode over the second semiconductor film;
   a third semiconductor film over the second electrode;
   a fourth electrode over the third semiconductor film;
   an insulating film over the second electrode, the third electrode and the fourth electrode, the insulating film comprising an organic resin;
   a first wiring over the organic resin, wherein the first wiring is in direct contact with the first electrode;
   a second wiring over the insulating film, wherein the second wiring is in direct contact with the second electrode;
   a third wiring over the insulating film, wherein the third wiring is in direct contact with the third electrode; and
   a fourth wiring over and in direct contact with a top surface of the insulating film, wherein the fourth wiring is in direct contact with the fourth electrode,
   wherein the second electrode is capable of shielding light, so that the photodetector does not detect light passing through the second electrode.

5. A photodetector according to claim 1, wherein the substrate is a transparent substrate.

6. A photodetector according to claim 2, wherein the substrate is a transparent substrate.

7. A photodetector according to claim 3, wherein the substrate is a transparent substrate.

8. A photodetector according to claim 4, wherein the substrate is a transparent substrate.

9. A photodetector according to claim 1, wherein the organic resin is a transparent organic resin.

10. A photodetector according to claim 2, wherein the organic resin is a transparent organic resin.

11. A photodetector according to claim 3, wherein the organic resin is a transparent organic resin.

12. A photodetector according to claim 4, wherein the organic resin is a transparent organic resin.

13. A photodetector according to claim 2, wherein the second electrode is a metal electrode.

14. A photodetector according to claim 4, wherein the second electrode is a metal electrode.

15. A photodetector according to claim 3, wherein a portion of the substrate overlapping with the first semiconductor film is thinner than a portion of the substrate overlapping with the second semiconductor film.

16. A photodetector according to claim 4, wherein a portion of the substrate overlapping with the first semiconductor film is thinner than a portion of the substrate overlapping with the second semiconductor film.

17. A photodetector according to claim 1,
wherein a portion of the first electrode protrudes from under an end portion of the first semiconductor film, and
wherein the first wiring is in direct contact with the first electrode in the end portion of the first electrode.

18. A photodetector according to claim 2,
wherein a portion of the first electrode protrudes from under an end portion of the first semiconductor film,
wherein the first wiring is in direct contact with the first electrode in the end portion of the first electrode,
wherein a portion of the second electrode protrudes from under an end portion of the second semiconductor film, and
wherein the second wiring is in direct contact with the second electrode in the end portion of the second electrode.

19. A photodetector according to claim 3,
wherein a portion of the first electrode protrudes from under an end portion of the first semiconductor film, and
wherein the first wiring is in direct contact with the first electrode in the end portion of the first electrode.

20. A photodetector according to claim 4,
wherein a portion of the first electrode protrudes from under an end portion of the first semiconductor film,
wherein the first wiring is in direct contact with the first electrode in the end portion of the first electrode,
wherein a portion of the second electrode protrudes from under an end portion of the third semiconductor film, and
wherein the second wiring is in direct contact with the second electrode in the portion of the second electrode.

21. A photodetector according to claim 1,
wherein the first wiring is in direct contact with the first electrode through a first contact hole of the insulating film, and
wherein the second wiring is in direct contact with the second electrode through a second contact hole of the insulating film.

22. A photodetector according to claim 2,
wherein the first wiring is in direct contact with the first electrode through a first contact hole of the insulating film,
wherein the second wiring is in direct contact with the second electrode through a second contact hole of the insulating film, and
wherein the third wiring is in direct contact with the third electrode through a third contact hole of the insulating film.

23. A photodetector according to claim 3,
wherein the first wiring is in direct contact with the first electrode through a first contact hole of the insulating film,
wherein the second wiring is in direct contact with the second electrode through a second contact hole of the insulating film, and
wherein the third wiring is in direct contact with the third electrode through a third contact hole of the insulating film.

24. A photodetector according to claim 4,
wherein the first wiring is in direct contact with the first electrode through a first contact hole of the insulating film,
wherein the second wiring is in direct contact with the second electrode through a second contact hole of the insulating film,
wherein the third wiring is in direct contact with the third electrode through a third contact hole of the insulating film, and
wherein the fourth wiring is in direct contact with the fourth electrode through a fourth contact hole of the insulating film.

* * * * *